United States Patent [19]

Sayles

[11] Patent Number: 5,585,453
[45] Date of Patent: Dec. 17, 1996

[54] COMPOSITE MOTOR CASE POLYMERS THAT EXPAND ON POLYMERIZATION

[75] Inventor: David C. Sayles, Huntsville, Ala.

[73] Assignee: The United States of America as represented by the Secretary of the Army, Washington, D.C.

[21] Appl. No.: 400,574

[22] Filed: Jul. 14, 1982

[51] Int. Cl.⁶ .................................................. C08G 59/00
[52] U.S. Cl. .................... 528/103.5; 528/106; 528/124
[58] Field of Search .................... 60/200.1, 253; 528/124

[56] References Cited

U.S. PATENT DOCUMENTS

| | | | |
|---|---|---|---|
| 3,293,860 | 12/1966 | Stedfeld | 60/253 |
| 3,321,101 | 5/1967 | Griffith | 528/124 |
| 3,765,177 | 10/1973 | Ritchey et al. | 60/253 |
| 4,003,876 | 1/1977 | Warfield et al. | 528/124 |
| 4,054,029 | 10/1977 | Sayles | 60/253 |
| 4,360,456 | 11/1982 | Firth | 528/124 |
| 4,366,108 | 12/1982 | Urech et al. | 528/124 |

OTHER PUBLICATIONS

Chem. Abstr. 67, 54117v (1967).
Chem. Abstr. 63, 11732h (1965).
Chem. Abstr. 65, 4052g (1966).
Chem. Abstr. 72, 56094n (1970).
Bodenbenner, K., *Justus Liebig Ann. Chem.*, 623, 183 (1959).

*Primary Examiner*—Charles T. Jordan
*Assistant Examiner*—John R. Hardee
*Attorney, Agent, or Firm*—Jack W. Voigt; Werten F. W. Bellamy

[57] ABSTRACT

Polycyclic spiroorthoester which undergo expansion on polymerization to form resins, rather than shrinkage on polymerization, are employed in fabrication of composite, filament-reinforced, interceptor motor cases. The advantages which accrue to such use of the specified resins relate to the imparting of unique characteristics to the interceptor motor case such as increased structural strength, a reduction in the number of microcracks and voids, and improved bonding between resin and reinforcement. These unique characteristics impart benefits where needed since composite motor cases are fabricated from high strength filaments or tapes such as fiberglass, graphite, poly-p-phenyleneterephthalamide (Kevlar), in a polymeric matrix, and the primary mode of failure is due either to poor adhesion between the matrix and the filament or tapes or because of the development of microcracks or voids in the matrix.

The spiroorthoester, 1,4,6-trioxaspiro [4.4]nonane, is an example of a resin modifier which converts the basic resin composition into an expandable resin. The basic resin composition is comprised of basically a three component system for use in fabrication of a graphite-composite motor case. One component EA-953A is a mixture of Bisphenol A-epichlorohydrin and epoxidized dimer of oleic acid, the second component is RD-2 which is butanediol diglycidyl ether, and the third component is TONOX 60/40 which is a mixture of 65% diaminodiphenylmethane, 10% triamines, and 25% polyamines. These components are employed in a ratio of about 100, 25, and 20 parts by weight in the HBRF-215 formulation. The spiroorthester is substituted for a portion of the second component in an amount from about 2 to about parts by weight.

3 Claims, No Drawings

COMPOSITE MOTOR CASE POLYMERS THAT EXPAND ON POLYMERIZATION

DEDICATORY CLAUSE

The invention described herein may be manufactured, used, licensed by or for the Government for governmental purposes without the payment to me of any royalties thereon.

BACKGROUND OF THE INVENTION

Composite motor cases are fabricated from high strength filaments or tapes such as fiberglass, graphite, poly-p-phenyleneterephthalamide (Kevlar), in a polymeric matrix. The primary mode of failure is due either to poor adhesion between the matrix and the filament or tapes or because of the development of microcracks or microvoids in the matrix. Both of these problems are at least in part related to the fact that when the matrix undergoes polymerization, a pronounced shrinkage in volume takes place. If the matrix were to undergo expansion in dimensions, it would expand onto the irregular surface of the filaments or tapes and into the crevasses and in this manner produce considerably stronger micromechanical adhesion between the matrix and filament or tape.

An object of this invention is to provide composite motor case polymers that expand on polymerization.

Another object of this invention is to provide a matrix formulation for use in a composite motor case wherein the matrix undergoes expansion in dimensions when the matrix composition undergoes polymerization to thereby achieve an expansion onto the irregular surfaces of the filaments or tapes and into the crevasses and in this manner produce considerably stronger micromechanical adhesion between the matrix and filament or tape.

SUMMARY OF THE INVENTION

The spiroorthoester, 1,4,6-trioxaspiro[4.4]nonane is employed to convert the basic resin composition employed in composite motor cases into an expandable resin during the polymerization or curing phase. The unmodified resin normally would undergo pronounced shrinkage in volume; however, when the specified spiroorthoester is incorporated into the matrix composition, as a partial replacement for butanediol diglycidyl ether (RD-2), the basic resin undergoes expansion in dimensions during the polymerization or curing phase to thereby result in expansion onto the irregular surface of the filaments or tapes and into the crevasses between the filaments or tapes. The described expansion produces considerably stronger micromechanical adhesion between the matrix and the filament or tape of the composite motor case.

The formulation of the basic composition of the resin employed in the manufacture of a typical composite motor case using graphite filaments or tapes, glass fibers, or poly-p-phenyleneterephthalamide filaments or fibers is comprised of a mixture of equal parts of bisphenol A-epichlorohydrin and epoxidized dimer of oleic acid (EA-953A) of about 100 parts by weight, butanediol diglycidyl ether (RD-2) of about 25 parts by weight, and a mixture consisting of 65% diaminodiphenylmethane, 10% triamines, and 25% polyamines (TONOX 60/40) of about 20 parts by weight.

Poly-p-phenyleneterephthalamide (Kevlar 49) is a high strength material used in an advanced composite motor case as a preferred fiber or filament. Kevlar 49 has a molecular weight in the range from about 2500–5000 and has the following structural formula:

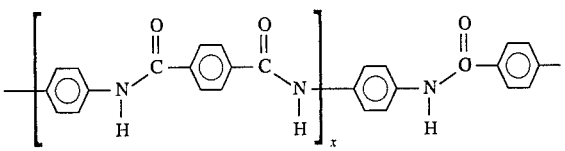

wherein X ranges from about 10 to about 20 repeat molecules.

Du Pont's Kevlar aramid structure features para chain extension, forming stiff molecules that can be oriented; hence, their usefulness in filament reinforced structures such as composite rocket motor cases, radial tires, etc. has been recognized, and exploited.

DESCRIPTION OF THE PREFERRED EMBODIMENT

The spiroorthoester, 1,4,6-trioxaspiro [4.4]nonane, is employed in the basic resin and curative blend composition to convert the basic resin composition into an expandable resin. 1,4,6-trixoxaspiro [4.4]nonane is the condensation product of butyrolactone with ethylene oxide in the presence of boron trifluoride.

By undergoing expansion rather than shrinkage during the polymerization and curing phase, a great benefit in properties is achieved. For example, since resin expansion causes the matrix to undergo expansion in dimensions, it expands onto the irregular surface of the filaments or tapes and into the crevasses and in this manner produce considerably stronger micromechanical adhesion between the matrix and filament or tape.

The basic composition of the resin blend and curative which is used in the fabrication of graphite-composite motor cases is presented in Table I.

TABLE I

Basic Composition of the Resin Used in the Manufacture of Graphite-Composite Motor Cases

| INGREDIENT | COMPOSITION (PARTS BY WEIGHT) |
|---|---|
| EA-953 A (1) | 100 |
| RD-2 (2) | 25 |
| TONOX 60/40 (3) | 20 |

(1) A mixture of equal parts of bisphenol A-epichlorohydrin and epoxidized dimer of oleic acid (manufactured by Hysol Division, Dexter Corp., 2850 Willow Tass Road, Pittsburg, CA 94565).
(2) Butanediol diglycidyl ether (manufactured by CIBA-Geigy Corp., Ardsley, NY).
(3) A mixture of 65% diaminodiphenylmethane, 10% triamines and 25% polyamines (manufactured by Uniroyal Inc., Uniroyal Chemical Division Co., Spencer Street, Naugatuck, CT 06770).

The use of the spiroorthoester, 1,4,6-trioxaspiro [4.4] nonane, is illustrated in Table II with the basic resin composition. The resulting benefits as a result of the replacement for RD-2 are also illustrated in Table II.

TABLE II

Effect of Spiroorthoesters on Epoxy Matrices used in Fabricating Composite Motor Cases

| | CONTROL* FORMULATION (PARTS BY WT) | COMPOSITE RESIN COMPOSITION (PARTS BY WT) | |
|---|---|---|---|
| | | A | B |
| INGREDIENT | | | |
| EA-953A | 100 | 100 | 100 |
| RD-2 | 25 | 23 | 20 |
| TONOX 60/40 | 20 | 20 | 20 |
| TRIOXASPIRONONANE | — | 2 | 5 |
| CHARACTERISTICS | | | |
| Initial Viscosity (CPS) | 800–900 | 750–900 | 900–950 |
| Time to 5000 CP (77° F.) (hr) | 10–12 | 10 | 9 |
| Tensile Strength (psi) | 3600 | 4100 | 4850 |
| Elongation (%) | 54 | 61 | 68 |
| Initial Modulus (psi) | 55,000 | 55,000 | 57,000 |
| Density (g/ml) | 1.10 | 1.11 | 1.12 |

*HBRF-215 — Resin used in the fabrication of the graphite-composite motor case developed under contract DASG60-75-C-0092. "Advanced Motor Cases."

The equivalent composition of EA-953A of Tables I and II consists of equal parts of diglycidyl ether of bisphenol A (EPON 828) and epoxidized dimer of oleic acid (EPON 871) whose structural formulae are illustrated below.

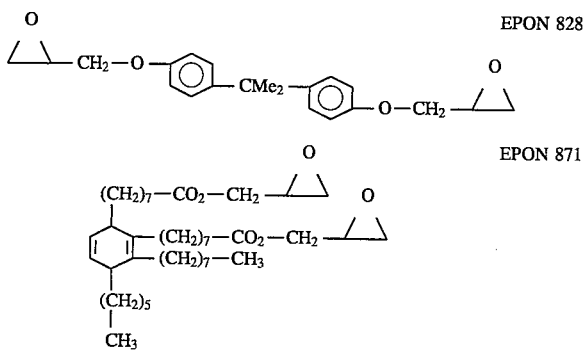

An explanation as to why the spiroorthoesters produce expansion is due to the fact that these monomers undergo ring opening on polymerization.

The expansion or the reduced shrinkage which occurs with ring-opening polymerization of the type which takes place with the trioxaspironane and related compounds has been attributed to the fact that for every bond that undergoes a change from a van der Waals distance to a covalent distance, at least two other bonds change from a covalent distance to a near van der Waals distance.

This contrasts with condensation and addition polymerization. In condensation polymerization, shrinkage would be expected because a small molecule is eliminated during the formation of the new bona. The amount of shrinkage that would occur would depend upon the size of the molecule that was eliminated. During addition polymerization, even though there is no small molecule eliminated, shrinkage occurs because the atoms end up much closer to one another in the polymer than they were in the monomer.

The mechanism of the polymerization of these bicyclospiroorthoesters undoubtedly involves the formation of an oxonium ion and a stabilized carbonium ion. It can be described by the following intermediate steps:

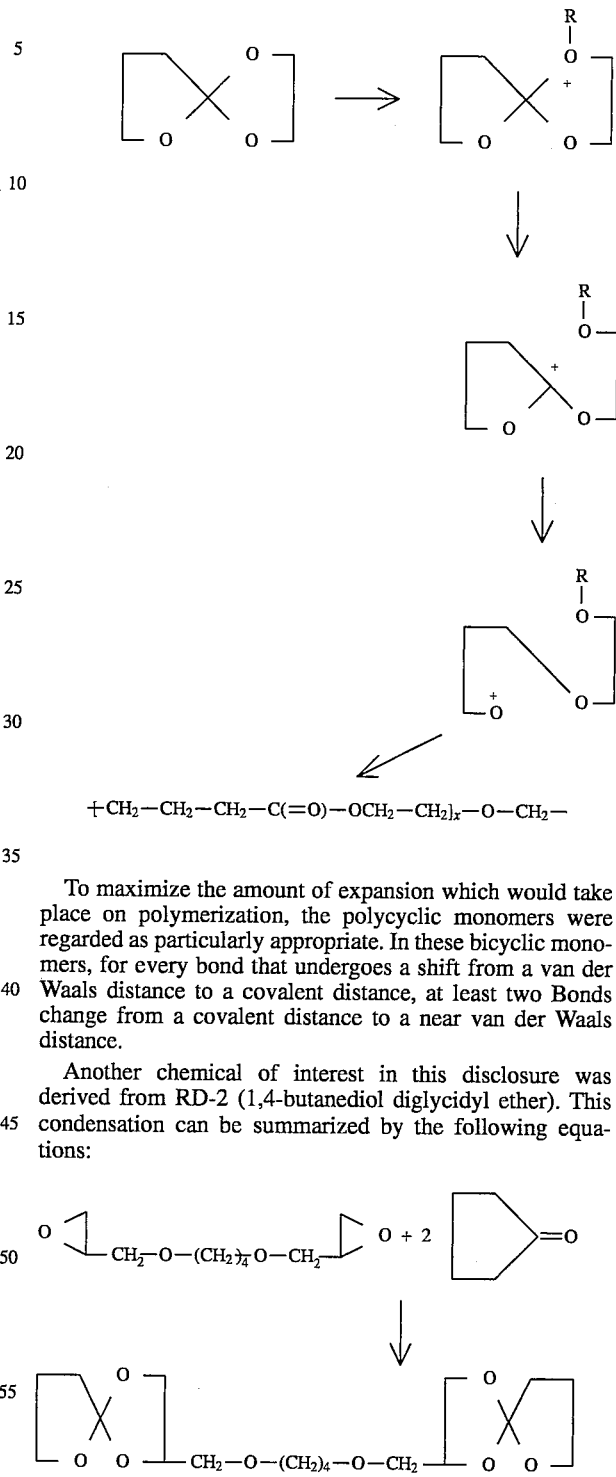

To maximize the amount of expansion which would take place on polymerization, the polycyclic monomers were regarded as particularly appropriate. In these bicyclic monomers, for every bond that undergoes a shift from a van der Waals distance to a covalent distance, at least two Bonds change from a covalent distance to a near van der Waals distance.

Another chemical of interest in this disclosure was derived from RD-2 (1,4-butanediol diglycidyl ether). This condensation can be summarized by the following equations:

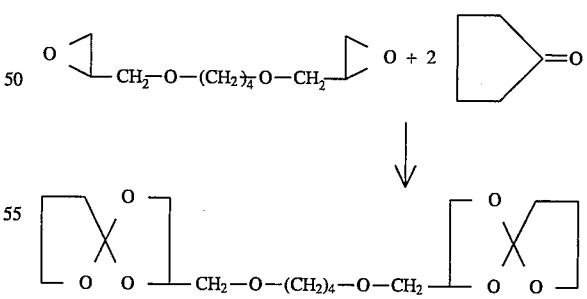

The resulting product is 1,8-bis (1,4,6- trioxaspiro [4.4] nonyl)- 2,7-dioxanonane.

I claim:

1. A matrix resin composition comprising
   a. about 100 parts by weight of a first component which is a two component mixture of approximately equal parts by weight of diglycidyl ether of bisphenol A and an epoxidized dimer of oleic acid;

b. of about 20 to about 23 parts by weight of a second component of butanediol diglycidyl ether;

c. of about 20 parts by weight of a third component which is a three component mixture of diaminodiphenylmethane in a ratio of about 65 parts of said diaminodiphenylmethane with about 10 parts by weight of triamines and with about 25 parts by weight of polyamines; and, d. of a fourth component of 1,4,6-trioxaspiro[4.4]nonane in parts by weight from about 2 to about 5 to achieve a conversion of said first three compositions of said matrix resin composition from a shrinkable matrix resin composition to an expandable matrix resin composition during polymerization or curing phase of said matrix resin composition.

2. The matrix resin composition of claim 1 wherein said second component is present in an amount of about 23 parts by weight and wherein said fourth composition of said 1,4,6-trioxaspiro[4.4]nonane is present in an amount of about 2 parts by weight.

3. The matrix resin of claim 1 wherein said second component of butanediol diglycidyl either is present in an amount of about 20 parts by weight and wherein said fourth composition of said 1,4,6-trioxaspiro[4.4]nonane is present in an amount of about 5 parts by weight.

* * * * *